United States Patent
Aggarwal et al.

(10) Patent No.: US 11,531,980 B2
(45) Date of Patent: Dec. 20, 2022

(54) METHOD AND SYSTEM FOR OPTIMIZING BLOCKCHAIN PARSING USING A WALLET'S STATIC CHARACTERISTICS

(71) Applicant: MASTERCARD INTERNATIONAL INCORPORATED, Purchase, NY (US)

(72) Inventors: Anurag Aggarwal, Rewari (IN); Chandan Garg, Haryana (IN); Ankur Arora, New Delhi (IN); Aditya Koduri, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 557 days.

(21) Appl. No.: 16/705,396

(22) Filed: Dec. 6, 2019

(65) Prior Publication Data
US 2021/0174343 A1    Jun. 10, 2021

(51) Int. Cl.
*G06Q 20/36* (2012.01)
*G06Q 20/38* (2012.01)
*H04L 9/06* (2006.01)
*H04L 9/14* (2006.01)
*G06Q 10/04* (2012.01)

(52) U.S. Cl.
CPC ............ *G06Q 20/36* (2013.01); *G06Q 10/04* (2013.01); *G06Q 20/3825* (2013.01); *G06Q 20/3829* (2013.01); *H04L 9/0637* (2013.01); *H04L 9/14* (2013.01); *G06Q 2220/00* (2013.01); *H04L 2209/56* (2013.01)

(58) Field of Classification Search
CPC .. G06Q 20/36; G06Q 10/04; G06Q 209/3825; G06Q 20/3829; G06Q 2220/00; H04L 9/0637; H04L 9/14; H04L 2209/56
See application file for complete search history.

(56) References Cited

U.S. PATENT DOCUMENTS

| | | | |
|---|---|---|---|
| 2016/0260169 A1* | 9/2016 | Arnold | G06Q 20/023 |
| 2017/0132621 A1* | 5/2017 | Miller | H04L 9/0637 |

(Continued)

FOREIGN PATENT DOCUMENTS

WO    WO-2019075560 A1 *    4/2019    ........... G06F 16/27

OTHER PUBLICATIONS

Roman Blum et al., Superlight—A Permissionless, Light-client Only Blockchain with Self-Contained Proofs and BLS Signatures, May 16, 2019, IEEE, pp. 36-41 (Year: 2019).*

*Primary Examiner* — Neha Patel
*Assistant Examiner* — Nilesh B Khatri
(74) *Attorney, Agent, or Firm* — Panitch Schwarze Belisario & Nadel LLP

(57) ABSTRACT

A method for optimized validation of a blockchain transaction through the use of a parallel database and date management includes: receiving a new blockchain transaction that includes unspent transaction outputs; identifying, in a parallel database, a start date for a blockchain wallet involved in the new transaction; identifying a subset of blocks in the blockchain that have been added to the blockchain since the start date; validating the new blockchain transaction by validating the unspent transaction outputs using the subset of blocks; and, if the validation is successful, adding the new transaction to the blockchain, or, if the validation is unsuccessful, notifying the submitter of the failed validation.

16 Claims, 5 Drawing Sheets

(56) References Cited

U.S. PATENT DOCUMENTS

| | | | |
|---|---|---|---|
| 2017/0317997 A1* | 11/2017 | Smith | G06Q 20/3829 |
| 2018/0025442 A1* | 1/2018 | Isaacson | H04L 63/0861 |
| | | | 705/26.62 |
| 2018/0121909 A1* | 5/2018 | Christidis | G06Q 20/383 |
| 2018/0308134 A1* | 10/2018 | Manning | G06Q 30/08 |
| 2021/0176058 A1* | 6/2021 | Cheng | G06Q 20/3825 |

* cited by examiner

METHOD AND SYSTEM FOR OPTIMIZING BLOCKCHAIN PARSING USING A WALLET'S STATIC CHARACTERISTICS

FIELD

The present disclosure relates to the optimized validation of a blockchain transaction through the use of a parallel database and date management, specifically the use of the static characteristics of blockchain wallets to optimizing the confirmation of transactions and parsing of new blocks.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. Blockchains often rely on miners that participate in confirming transactions, where confirmation of transactions involves reviewing the entire chain to identify the unspent outputs being used in a transaction and ensuring that the currency is still available for transfer by the spender. While this can be a relatively simple operation, the operation becomes more time consuming and laborious for miners as the size of the blockchain increases.

Blockchains are designed to be permanent and immutable records, where the entire chain continues without archiving or other data reduction techniques. As such, the longer a blockchain operates, the longer the chain gets, and the more data that must be reviewed each time a new transaction occurs. Thus, the bandwidth and computing resources consumed by the blockchain constantly increases, compounding the problem and vastly increasing the costs for operation of the blockchain. As a result, there is a need for a technical solution to optimize the confirmation of new transactions to reduce the analysis required, thereby reducing the time and resource consumption for nodes in a blockchain network.

SUMMARY

The present disclosure provides a description of systems and methods for optimized validation of a blockchain transaction through the use of a parallel database and date management. Static characteristics of each blockchain wallet involved in a blockchain are stored in a parallel database, the static characteristics including, for example, the start date of the wallet. When a new transaction is submitted for confirmation, a node can identify the static characteristics for the involved wallets in the parallel database and adjust its analysis accordingly. For example, if a blockchain is started in January 2015, but the two involved wallets do not begin with their first transactions until January 2019, the node can limit its analysis of the blockchain to blocks submitted since January 2019. As a result, the node can still successful confirm the transaction, but can do so by only analyzing one-fifth of the total data, vastly reducing the resources and bandwidth necessary for the confirmation, which also increases the speed and reduces the energy requirements for operation of the node.

A method for optimized validation of a blockchain transaction through the use of a parallel database and date management includes: receiving, by a receiver of a blockchain node in a blockchain network, a new blockchain transaction, the new blockchain transaction including at least a digital signature for a first blockchain wallet, one or more unspent transaction outputs, a destination address for a second blockchain wallet, and a transaction amount; identifying, by a processor of the blockchain node, a target data value stored in a parallel database, where the target data value is associated with the first blockchain wallet and includes a target date; identifying, by the processor of the blockchain node, a subset of blocks in a blockchain managed by the blockchain network, where the subset of blocks includes each block in the blockchain network that includes a block header including a timestamp after the target date; validating, by the processor of the blockchain node, the new blockchain transaction by validating at least the one or more unspent transaction outputs based on blockchain data values included in the identified subset of blocks; and if validation of the new blockchain transaction is successful, generating, by the processor of the blockchain node, a new block including a new block header and one or more new data values, the one or more new data values including the new blockchain transaction, and transmitting, by a transmitter of the blockchain node, the new block to a plurality of additional nodes in the blockchain network, or if validation of the new blockchain transaction is unsuccessful, transmitting, by the transmitter of the blockchain node, a notification message to a computing device indicated the unsuccessful validation of the new blockchain transaction.

A system for optimized validation of a blockchain transaction through the use of a parallel database and date management includes: a blockchain network; a computing device; a plurality of additional nodes included in the blockchain network; and a blockchain node in the blockchain network, where the blockchain node includes a receiver receiving a new blockchain transaction, the new blockchain transaction including at least a digital signature for a first blockchain wallet, one or more unspent transaction outputs, a destination address for a second blockchain wallet, and a transaction amount, a processor identifying a target data value stored in a parallel database, where the target data value is associated with the first blockchain wallet and includes a target date, identifying a subset of blocks in a blockchain managed by the blockchain network, where the subset of blocks includes each block in the blockchain network that includes a block header including a timestamp after the target date, and validating the new blockchain transaction by validating at least the one or more unspent transaction outputs based on blockchain data values included in the identified subset of blocks, and a transmitter, wherein if validation of the new blockchain transaction is successful the processor of the blockchain node generates a new block including a new block header and one or more new data values, the one or more new data values including the new blockchain transaction, and the transmitter of the blockchain node transmits the new block to a plurality of additional nodes in the blockchain network, or if validation of the new blockchain transaction is unsuccessful the transmitter of the blockchain node transmits a notification message to a computing device indicated the unsuccessful validation of the new blockchain transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Optimized Validation of Blockchain Transactions

Figure 1:
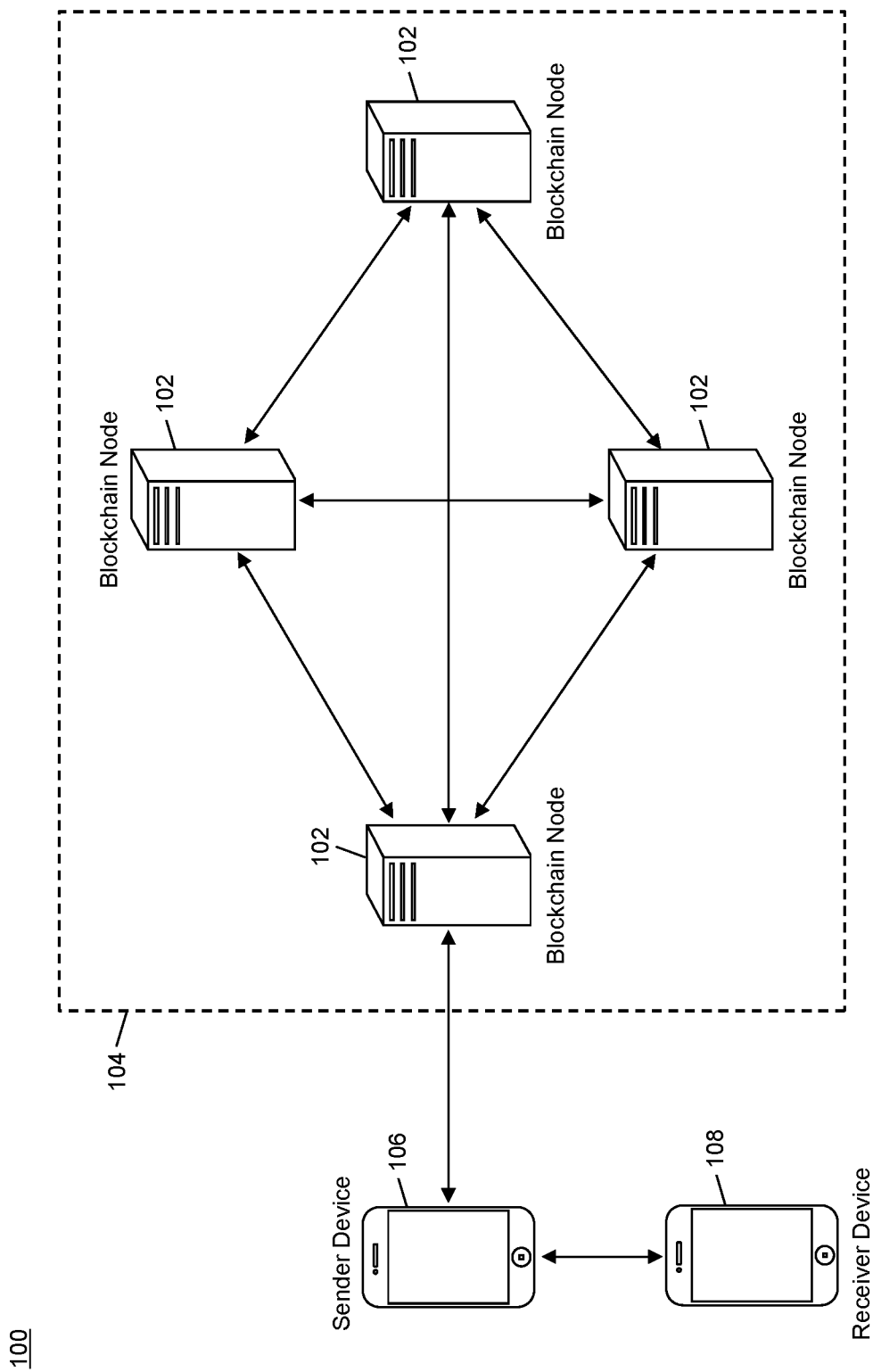
FIG. 1 is a block diagram illustrating a high-level system architecture for optimized validation of blockchain transactions in accordance with exemplary embodiments.

FIG. 1 illustrates a system 100 for optimizing the validation and confirmation of new blockchain transactions through the use of a parallel database and management of dates related to blockchain wallets.

Figure 2:
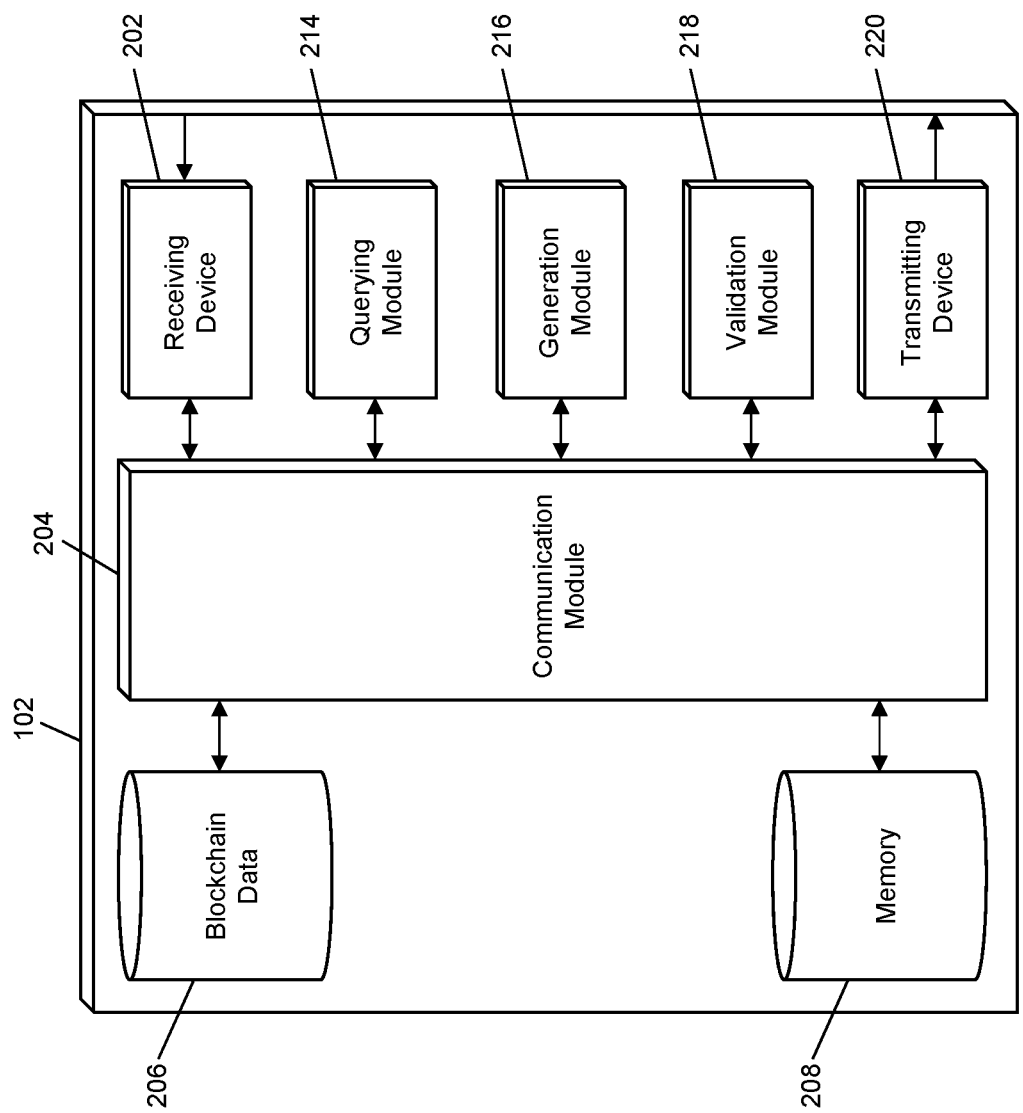
FIG. 2 is a block diagram illustrating the blockchain node of the system of FIG. 1 for optimized blockchain transaction validation in accordance with exemplary embodiments.
Figure 5:
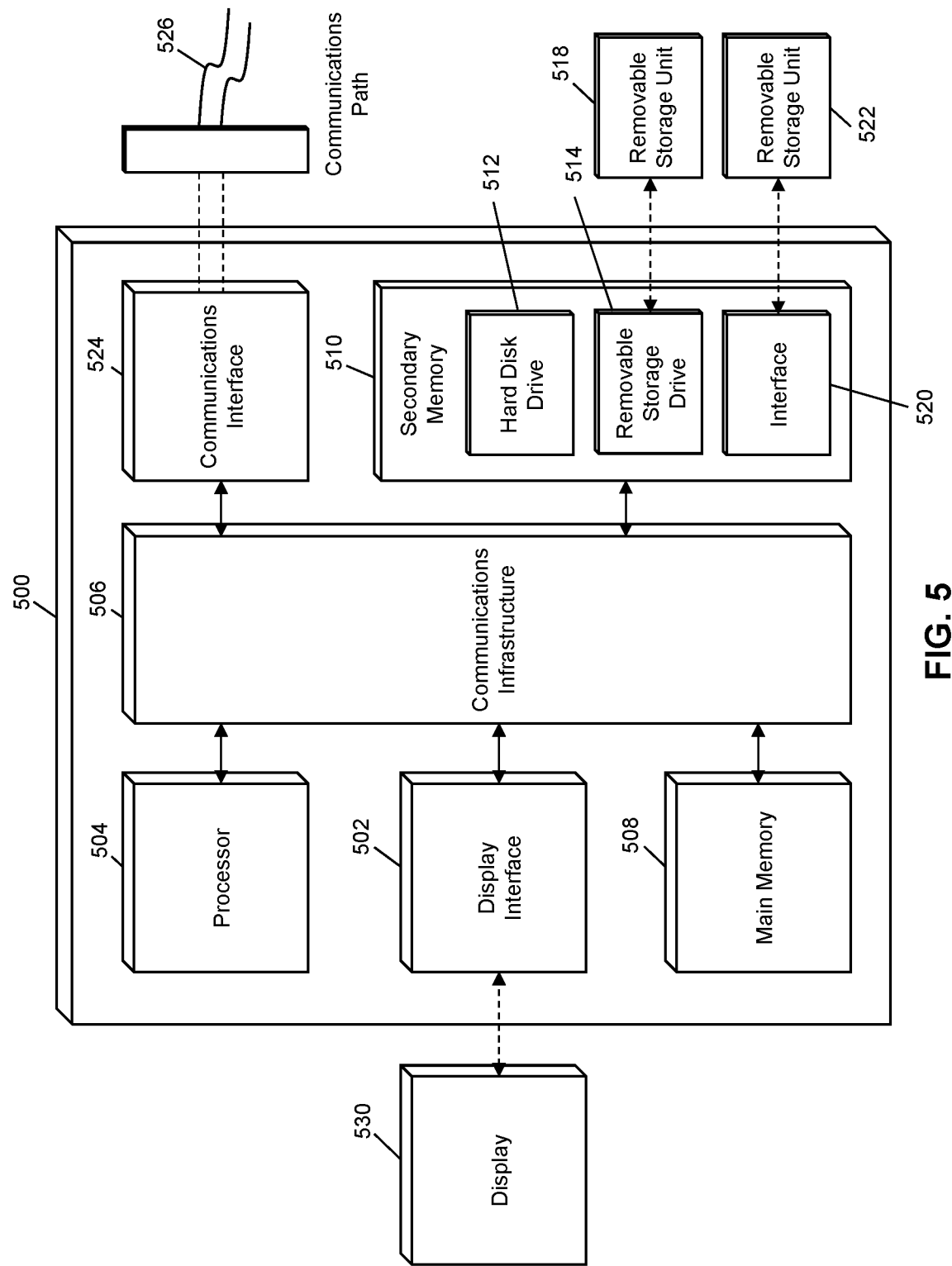
FIG. 5 is a block diagram illustrating a computer system architecture in accordance with exemplary embodiments.

The system 100 may a blockchain network 104. The blockchain network 104 may be comprised of a plurality of blockchain nodes 102. Each blockchain node 102 may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In a traditional blockchain network 104, each blockchain node 102 that confirms a new transaction will analyze the entire blockchain, identifying any transactions that involve the blockchain wallets involved in the new transaction and reviewing them to identify if the blockchain wallet still has access to the unspent transactions included in the new transaction and that they have not been spent prior to the new transaction, preventing what is known in the industry as "double spend." In the system 100, the blockchain network 104 may maintain a parallel database, which is used to reduce the data that needs to be analyzed during the confirmation of new blockchain transactions. The parallel database may be another blockchain or a sidechain to the blockchain, or a suitable type of alternative data storage, that stores data regarding the operation of blockchain wallets involved in the blockchain network 104. In an exemplary embodiment, the parallel database stores the public key as an identifier for each blockchain wallet and a start date of the blockchain wallet, where the start date is a timestamp for the earliest block in the blockchain that involves the blockchain wallet. The parallel database may be maintained by the blockchain nodes 102 in the same fashion as the blockchain or may be maintained by other computing devices associated with the blockchain network 104, such as an alternative set of blockchain nodes 102 that only manage the parallel database.

In the system 100, a sender device 106 may submit a new transaction to a blockchain node 102 in the blockchain network 104 for sending an amount of currency to a receiver device 108. When the new transaction is received by the blockchain node 102, the blockchain node 102 will identify entries in the parallel database for the involved blockchain wallets for the sender device 106 and the receiver device 108. In some cases, analysis may only be performed for the blockchain wallet that is sending currency, as there may be no risk of fraud or impropriety involving the receiving blockchain wallet. The blockchain node 102 therefore identifies an entry in the parallel database for the blockchain wallet associated with the sender device 106. The entry may include at least the start date for the sender device 106 as the timestamp for the first block in the blockchain involving the sender device 106, such as the first time the sender device's blockchain wallet ever received currency (e.g., the first transaction for any wallet is likely to be the receipt of currency due to how blockchains operate from genesis).

The blockchain node 102 may then attempt to confirm the new blockchain transaction by validating the digital signature generated by the sender device 106 and included in the submission, and also validating the unspent transaction outputs provided in the transaction. Validation of the unspent transaction outputs may include identifying the transactions to which the outputs correspond (e.g., which may utilize transaction indices, which may be submitted with the transaction outputs) in the blockchain and analyzing other blockchain data values to ensure that the transaction outputs have not been previously used in another transaction. In other words, the blockchain node 102 must ensure that the currency trying to be spent by the sender device 106 has not already been spent elsewhere. In a traditional blockchain, the blockchain node 102 would start at the genesis block and review every block and its blockchain data values through the entire life of the blockchain to identify the transaction outputs and ensure they have not been utilized. In the system 100, the blockchain node 102 can limit its analysis to only the first block since the sender device 106 (e.g., and receiver device 108, as applicable) became involved in the blockchain and the blocks added since then. In the above example, this may result in the blockchain node 102 only having to analyze one-fifth of the blocks currently in the blockchain.

The blockchain node 102 may perform the analysis to confirm the transaction. If the confirmation fails, such as due to an earlier spending of one of the transaction outputs or the blockchain node 102 identifies that one of the transaction outputs was sent to a wallet other than the sender device 106, then the blockchain node 102 may notify the sender device 106 accordingly and the transaction may be prevented from processing. If the confirmation is successful, then the new transaction may be added to the blockchain by being included in a new block as a blockchain data value that is then confirmed by other blockchain nodes 102 and added to the blockchain using traditional processes. The result is that the new transaction may be successfully processed with one-fifth of the analysis, and thus one-fifth of the time and resources necessary in traditional blockchains, vastly increasing the operating efficiency of the blockchain network 104.

In cases where a new transaction is submitted and the blockchain node 102 cannot identify entries in the parallel database for both blockchain wallets, a new entry may be created in the parallel database for the blockchain wallets that do not have entries. In an exemplary embodiment, only a receiver device 108 may be missing an entry as any blockchain wallet sending currency must have already been involved in a past transaction. In these cases, upon successful confirmation of the new transaction, a new entry may be added to the parallel database for the receiver device's blockchain wallet, which includes the timestamp for the new block that includes the new transaction in the entry. Future analysis for transactions involving the receiver device 108 as the sender may thus only go back so far as the new block, greatly increasing efficiency for processing of transactions involving the receiver device 108.

In some embodiments, the sender device 106 may be configured to submit date information along with the new transaction, where the date information may include the start date for the sender device 106. In such embodiments, the blockchain node 102 may be able to skip the identification of data in the parallel database or may update the parallel database with the received start date upon successful confirmation of the new transaction.

In some instances, other dates may be utilized by the blockchain nodes 102. For example, some blockchains may utilize archiving techniques where new genesis blocks are created for a blockchain at predetermined intervals, such as discussed in more detail in U.S. patent application Ser. No. 16/381,134, entitled "Method and System for Improved Blockchain Performance Through Aggregation," filed on Apr. 11, 2019, which is herein incorporated by reference in its entirety. In such instances, each time a new genesis or aggregation block is made for a blockchain wallet, the timestamp for that block may be added to the entry in the parallel database for the blockchain wallet, which may supersede the start date for that wallet. For example, if the sender device's blockchain wallet started operation in January 2019, but an aggregation for the wallet was performed in June 2019, for the new transaction the blockchain node 102 could limit its analysis to blocks added starting in June 2019, further increasing operating efficiency.

In some embodiments, new entries may be added to the parallel database at a regular interval, such as instead of new entries being added when transactions are confirmed and/or added to the blockchain. For instance, if the new transaction involving the sender device 106 and receiver device 108 is one where the receiver device 108 is participating in its first blockchain transaction, the transaction may be confirmed and added to a block without immediate updating of the parallel database. In such embodiments, the blockchain nodes 102 that maintain the parallel database may review the blockchain data values added since its last processing time (e.g., during the regular interval) to identify new blockchain wallets (e.g., the receiver device 108). When a new blockchain wallet is identified, a new entry may be added to the parallel database for that blockchain wallet. In an example, such processing may be performed daily. In embodiments where archiving is utilized, as discussed above, such processing may involve identifying aggregation blocks and updating the parallel database entry for wallets that are aggregated accordingly.

The methods and systems discussed herein result in vastly increased operating efficiency for a blockchain network 104 over traditional systems. The use of a parallel database to store date information for blockchain wallets enables a blockchain node 102 to limit its analysis of past blocks in the blockchain to only those added since the relevant dates in the parallel database, which can vastly reduce the number of blocks that are analyzed, thereby increasing the speed of the operations performed by blockchain nodes 102 in the confirmation of transactions. This optimized validation can thus increase the efficiency of a blockchain network 104.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, receiver devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that are superimposed or otherwise encoded with confirmed blockchain transactions, confirmed blocks, messages regarding confirmation of blocks, new blocks for confirmation, and parallel database data. The receiving device 202 may also be configured to receive data signals electronically transmitted by sender devices 106 and receiver devices 108, which may be superimposed or otherwise encoded with new blockchain transactions for confirmation, date information, public keys, and other data for use in performing functions related to operation and usage of a blockchain as discussed herein.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, the parallel database and associated data, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 106, collected mining bids, mining bid weighting and selection rules, etc. In some cases, the blockchain data 206 may include the parallel database, such as stored in a separate database or as a sidechain or additional blockchain. The parallel database may include an entry for each blockchain wallet that has been involved with the blockchain and include at least identifying information (e.g., a public key of the wallet's cryptographic key pair) and date information, such as the timestamp for the first block in which the blockchain wallet received currency on the blockchain.

The blockchain node 102 may include a querying module 214. The querying module 214 may be configured to execute queries on databases to identify information. The querying module 214 may receive one or more data values or query strings and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the memory 208 to identify entries in the parallel database for the wallets involved in a newly submitted blockchain transaction, and then execute a query on the blockchain data 206 to identify the blocks that have been added since the start date for the sender device 106 to analyze the blockchain data values thereof for confirmation of the new transaction. If the blockchain node 102 is configured to maintain the parallel database, then the querying module 214 may be further configured to analyze new blocks added to the blockchain at predetermined intervals to identify new blockchain wallets and associated start dates, or to identify new aggregation dates for blockchain wallets, as applicable, based on data included in blockchain data values included in the new blocks.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. The validation module 218 may also be configured to validate digital signatures using public keys and suitable signature generation algorithms.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, receiver devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102 that are superimposed or otherwise encoded with new blockchain data values, new blocks for confirmation, confirmed blocks, messages regarding block or transaction confirmations, and other data used in the operation and management of the blockchain. If the blockchain node 102 is used in the management of the parallel database, the transmitting device 220 may also be configured to transmit data signals to other blockchain nodes 102 that are superimposed or otherwise encoded with date information, such as identified start dates or aggregation dates for blockchain wallets for storage in the parallel database. The transmitting device 220 may also be configured to electronically transmit data signals to sender devices 106 and receiver devices 108 that are superimposed or otherwise encoded with messages and notifications regarding blockchain transactions, such as notifications of successful or unsuccessful confirmations.

Process for Optimized Validation of Blockchain Transactions

Figure 3:
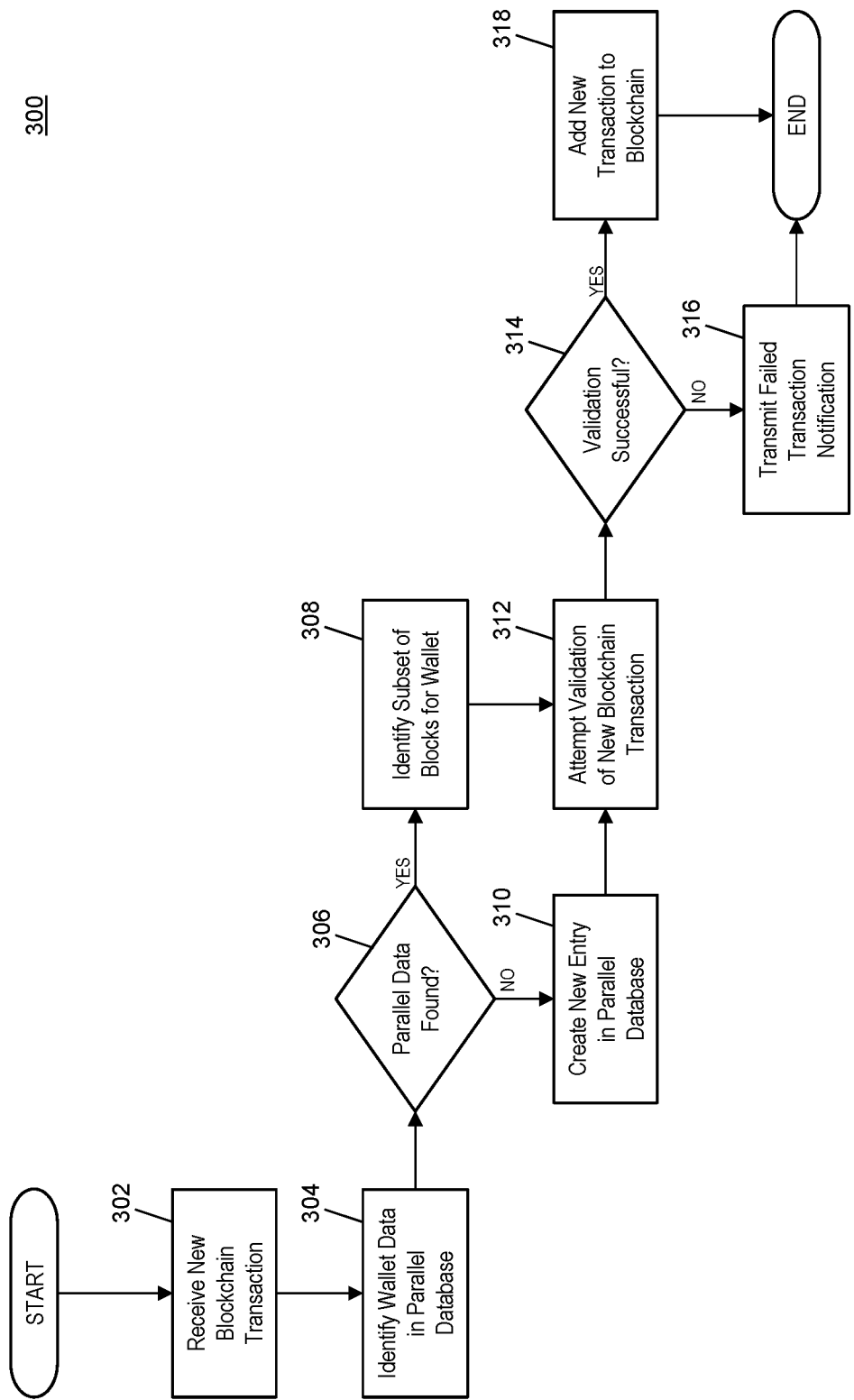
FIG. 3 is a flow diagram illustrating a process for optimized validation of a blockchain transaction by a blockchain node of FIG. 2 in the system of FIG. 1 in accordance with exemplary embodiments.

FIG. 3 illustrates a process 300 for the optimized validation of blockchain transactions by a blockchain node 102 in the system 100 that utilizes start date data for blockchain wallets involved in a new blockchain transaction to optimize the confirmation process.

In step 302, the receiving device 202 of the blockchain node 102 may receive a new blockchain transaction submitted by the sender device 106 using any suitable communication network and method. The new blockchain transaction may include at least a digital signature generated using the sender device's private key, one or more unspent transaction outputs (e.g., and associated indices, as applicable), a destination address generated using the receiver device's public key, a transaction amount to be transferred to that destination address, and any other additional data, such as additional destination addresses and associated amounts (e.g., for a remainder to be retained by the sender device 106 as change). In step 304, the querying module 214 of the blockchain node 102 may execute a query on the memory 208 of the blockchain node 102 to identify an entry in the parallel database for the sender device 106, such as using a public key of the sender device's blockchain wallet, which may also be included in the new transaction submission, and, in some instances, for the receiver device 108.

In step 306, the blockchain node 102 may determine if wallet data is found for the sender device's blockchain wallet in the parallel database, such as based on the results of the query performed in step 304. Wallet data may not be found for the sender device 106 if, for instance, the sender device 106 had not been previously registered or its first transaction occurred since the last interval where the parallel database was updated. If data entry was found in the parallel database for the sender device 106, then, in step 308, the querying module 214 of the blockchain node 102 may execute a query on the blockchain data 206 to identify only those blocks that have been added to the blockchain since the sender device's start date with the blockchain. If there is no data entry in the parallel database for the sender device 106, then, in step 310, the querying module 214 of the blockchain node 102 may execute a query on the memory 208 of the blockchain node 102 to insert a new entry in the parallel database for the sender device 106 that includes its public key and the current timestamp as its start date. In cases where step 304 included identifying a parallel database entry for the receiver device 108, steps 306 and 310, if applicable, may also be performed for the receiver device 108.

In step 312, the validation module 218 of the blockchain node 102 may attempt to confirm the blockchain transaction as validation thereof. Confirmation of the transaction may include validation of the digital signature using the sender device's public key, and analysis of all identified blocks (e.g., as identified in step 308 for optimized validation, if applicable) to determine if the sender device 106 is authorized to use each unspent transaction output, to ensure each unspent transaction output has not been used in a prior transaction, and to ensure that the currency associated with each unspent transaction output is sufficient to cover the transaction amounts to be used in the transfers in the new blockchain transaction. In step 314, the blockchain node 102 may determine if the validation performed in step 312 was successful or not based on the result provided by the validation module 218.

If the transaction was not successfully validated (e.g., confirmation failed), such as due to prior use of a transaction output or a failed validation of the digital signature, then, in step 316, the transmitting device 220 of the blockchain node 102 may electronically transmit a notification message to the sender device 106 using a suitable communication network and method to notify a user thereof that the transaction's validation failed. In such cases, the sender device 106 may be provided with an opportunity to update the transaction data and re-submit the new blockchain transaction, such as by adjusting the transaction amounts or changing the transaction outputs being submitted. If, in step 314, the blockchain node 102 determines that the transaction is confirmed successfully, then, in step 318, the generation module 216 of the blockchain node 102 may generate a new blockchain data value for the transaction, which may be included in a new block that is generated by a blockchain node 102, confirmed by other blockchain nodes 102, and added to the blockchain using standard processes.

Exemplary Method for Optimized Validation of a Blockchain Transaction

Figure 4:
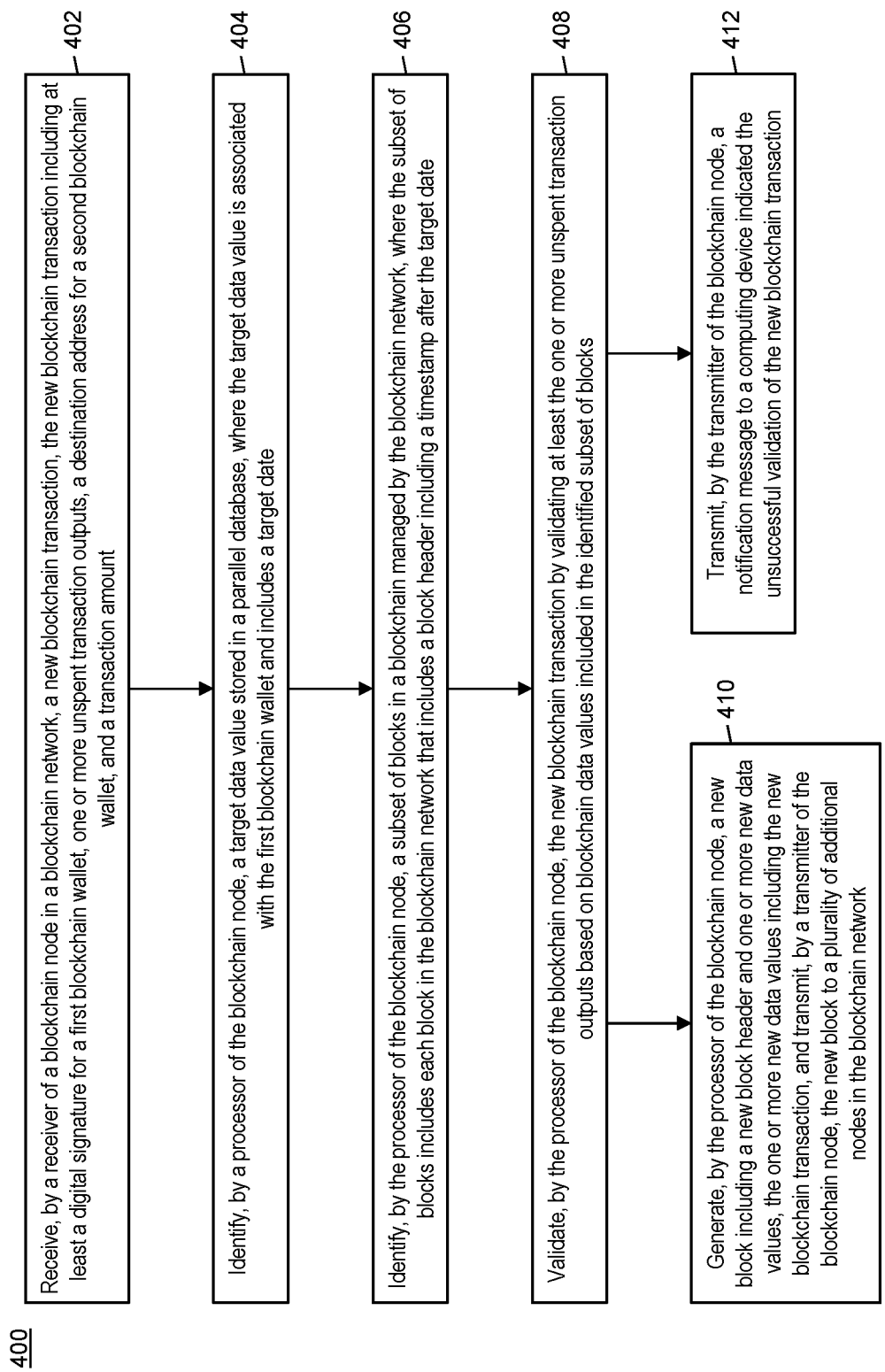
FIG. 4 is a flow chart illustrating an exemplary method for optimized validation of a blockchain transaction through the use of a parallel database and date management in mining fees in accordance with exemplary embodiments.

FIG. 4 illustrates a method 400 for the optimized validation of a blockchain transaction through the use of a parallel database and date management.

In step 402, a new blockchain transaction may be received by a receiver (e.g., the receiving device 202) of a blockchain node (e.g., blockchain node 102) in a blockchain network (e.g., blockchain network 104), the new blockchain transaction including at least a digital signature for a first blockchain wallet, one or more unspent transaction outputs, a destination address for a second blockchain wallet, and a transaction amount. In step 404, a target data value stored in a parallel database (e.g., the memory 208) may be identified by a processor (e.g., a querying module 214) of the blockchain node, where the target data value is associated with the first blockchain wallet and includes a target date. In step 406, a subset of blocks in a blockchain managed by the blockchain network may be identified by the processor of the blockchain node, where the subset of blocks includes each block in the blockchain network that includes a block header including a timestamp after the target date.

In step 408, the new blockchain transaction may be validated by the processor (e.g., validation module 218) of the blockchain node by validating at least the one or more unspent transaction outputs based on blockchain data values included in the identified subset of blocks. If validation of the new blockchain transaction is successful, then, in step 410, the processor (e.g., generation module 216) of the blockchain node may generate a new block including a new block header and one or more new data values, the one or more new data values including the new blockchain transaction, and a transmitter (e.g., the transmitting device 220) of the blockchain node may transmit the new block to a plurality of additional nodes (e.g., blockchain nodes 102) in the blockchain network. If validation of the new blockchain transaction is unsuccessful, then, in step 412, the transmitter of the blockchain node may transmit a notification message to a computing device (e.g., the sender device 106) indicating that the validation of the new blockchain transaction was unsuccessful.

In one embodiment, validating the new blockchain transaction may further include validating the digital signature using a public key of a cryptographic key pair associated with the first blockchain wallet. In a further embodiment, the public key may be included in the new blockchain transaction. In some embodiments, the target data value may be identified using a public key of a cryptographic key pair associated with the first blockchain wallet.

In one embodiment, the parallel database may be a secondary blockchain in the blockchain network. In some embodiments, the target date may be a date of a first transaction involving the first blockchain wallet. In one embodiment, the blockchain transaction may be received from the computing device. In a further embodiment, the computing device may be the first blockchain wallet.

Computer System Architecture

FIG. 5 illustrates a computer system 500 in which embodiments of the present disclosure, or portions thereof, may be implemented as computer-readable code. For example, the blockchain node 102 of FIGS. 1 and 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc.

Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for optimized validation of a blockchain transaction through the use of a parallel database and date management. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for optimized validation of a blockchain transaction through the use of a parallel database and date management, comprising:
   receiving, by a receiver of a blockchain node in a blockchain network, a new blockchain transaction, the new blockchain transaction including at least a digital signature for a first blockchain wallet, one or more unspent transaction outputs, a destination address for a second blockchain wallet, and a transaction amount;
   identifying, by a processor of the blockchain node, a target data value stored in a parallel database, where the target data value is associated with the first blockchain wallet and includes a target date;
   identifying, by the processor of the blockchain node, a subset of blocks in a blockchain managed by the blockchain network, where the subset of blocks includes each block in the blockchain that includes a block header including a timestamp after the target date;
   validating, by the processor of the blockchain node, the new blockchain transaction by validating at least the one or more unspent transaction outputs based on blockchain data values included in the identified subset of blocks; and
   if validation of the new blockchain transaction is successful, generating, by the processor of the blockchain node, a new block including a new block header and one or more new data values, the one or more new data values including the new blockchain transaction, and transmitting, by a transmitter of the blockchain node, the new block to a plurality of additional nodes in the blockchain network, or
   if validation of the new blockchain transaction is unsuccessful, transmitting, by the transmitter of the blockchain node, a notification message to a computing device indicating the unsuccessful validation of the new blockchain transaction.

2. The method of claim 1, wherein validating the new blockchain transaction further includes validating the digital signature using a public key of a cryptographic key pair associated with the first blockchain wallet.

3. The method of claim 2, wherein the public key is included in the new blockchain transaction.

4. The method of claim 1, wherein the target data value is identified using a public key of a cryptographic key pair associated with the first blockchain wallet.

5. The method of claim 1, wherein the parallel database is a secondary blockchain in the blockchain network.

6. The method of claim 1, wherein the target date is a date of a first transaction involving the first blockchain wallet.

7. The method of claim 1, wherein the new blockchain transaction is received from the computing device.

8. The method of claim 7, wherein the computing device is the first blockchain wallet.

9. A system for optimized validation of a blockchain transaction through the use of a parallel database and date management, comprising:
- a blockchain network;
- a computing device;
- a plurality of additional nodes included in the blockchain network; and
- a blockchain node in the blockchain network, where the blockchain node includes
  - a receiver receiving a new blockchain transaction, the new blockchain transaction including at least a digital signature for a first blockchain wallet, one or more unspent transaction outputs, a destination address for a second blockchain wallet, and a transaction amount,
  - a processor
    - identifying a target data value stored in a parallel database, where the target data value is associated with the first blockchain wallet and includes a target date,
    - identifying a subset of blocks in a blockchain managed by the blockchain network, where the subset of blocks includes each block in the blockchain that includes a block header including a timestamp after the target date, and
    - validating the new blockchain transaction by validating at least the one or more unspent transaction outputs based on blockchain data values included in the identified subset of blocks, and
  - a transmitter, wherein
    - if validation of the new blockchain transaction is successful the processor of the blockchain node generates a new block including a new block header and one or more new data values, the one or more new data values including the new blockchain transaction, and the transmitter of the blockchain node transmits the new block to a plurality of additional nodes in the blockchain network, or
    - if validation of the new blockchain transaction is unsuccessful the transmitter of the blockchain node transmits a notification message to a computing device indicating the unsuccessful validation of the new blockchain transaction.

10. The system of claim 9, wherein validating the new blockchain transaction further includes validating the digital signature using a public key of a cryptographic key pair associated with the first blockchain wallet.

11. The system of claim 10, wherein the public key is included in the new blockchain transaction.

12. The system of claim 9, wherein the target data value is identified using a public key of a cryptographic key pair associated with the first blockchain wallet.

13. The system of claim 9, wherein the parallel database is a secondary blockchain in the blockchain network.

14. The system of claim 9, wherein the target date is a date of a first transaction involving the first blockchain wallet.

15. The system of claim 9, wherein the new blockchain transaction is received from the computing device.

16. The system of claim 15, wherein the computing device is the first blockchain wallet.

* * * * *